Fig. 5
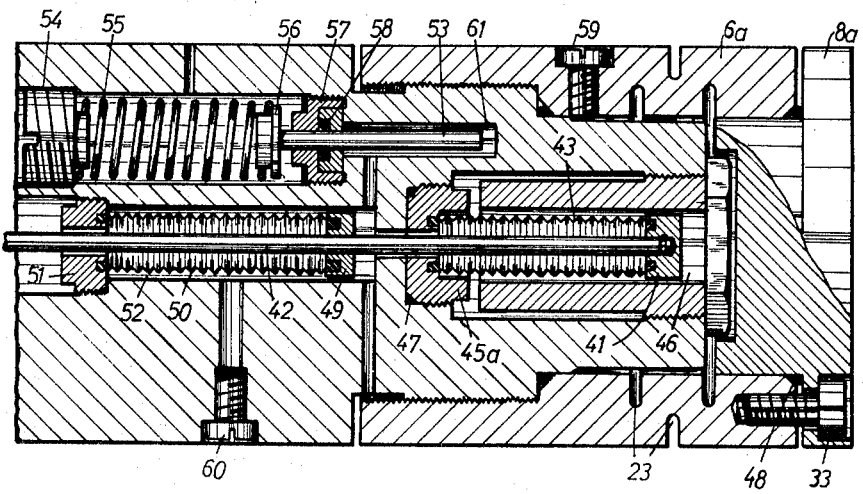
Fig. 6
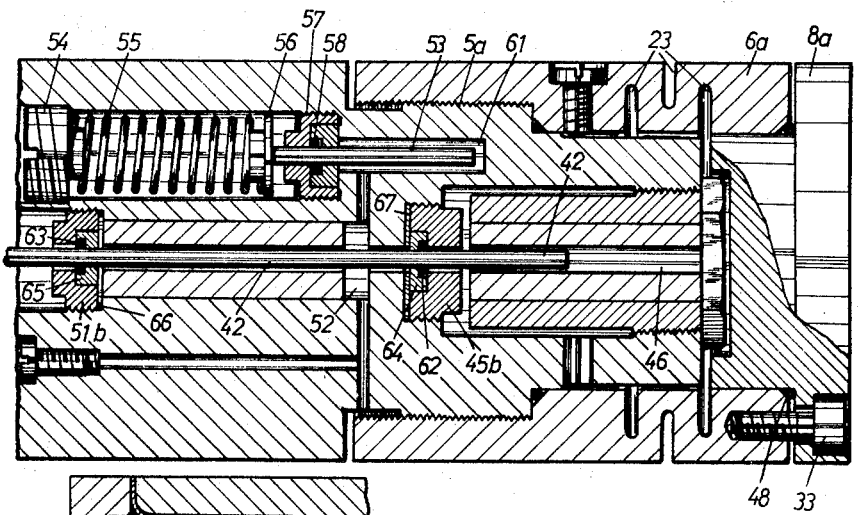
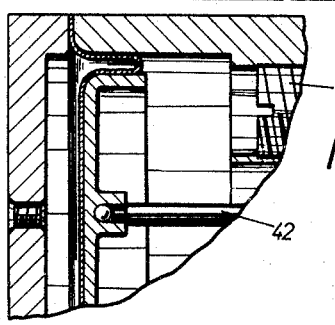
Fig. 6a

' # United States Patent Office 3,389,557
Patented June 25, 1968

3,389,557
METHOD OF AND DEVICE FOR PRODUCING VERY FINE ADJUSTMENTS FOR TOOL CARRIERS AND THE LIKE
Wolfgang Backé, Dortmund-Lottringhausen, Hans-Gerold Möbius, Aachen, Ernst-August Becker, Haaren, near Aachen, and Norbert Jeschke, Urberach, Germany, assignors to Samson Apparate-Bau AG., Frankfurt am Main, Germany
Filed Jan. 10, 1966, Ser. No. 519,671
Claims priority, application Germany, Jan. 14, 1965, S 95,008
11 Claims. (Cl. 60—54.5)

ABSTRACT OF THE DISCLOSURE

An apparatus for producing minute adjustments of tools subjected to great reaction forces, having stepped and hydraulically coupled and serially related pistons for transmitting an applied control force at a stepped-up ratio to an expandable bushing in a manner substantially free of play, hysteresis and friction so that a continuous proportional relationship is obtained between the applied control force and the corresponding displacement of the tool associated with the bushing.

---

The present invention relates to a method of and device for effecting very fine adjustments for tool carriers and the like, and, although not limited thereto, is intended in particular for effecting very fine feeding adjustments of the grinding disc of a grinding machine.

In connection with modern machining techniques, there prevails a tendency to proceed to narrower and narrower finished machining tolerances in connection with the machining of individual pieces as well as in connection with mass fabrication. In order to be able to obtain such fine tolerances, it is necessary, for instance, to be able to remove chips or effect cuts within the range from $\frac{1}{100}$ to $\frac{1}{4,000}$ of a millimeter. Feeding advancements of such magnitude cannot, in view of such precision requirements, be realized with the heretobefore known available means in the machine tool industry. The present state of the art in mechanical feeding systems will at best permit an adjusting precision of $\frac{1}{1,000}$ of a millimeter provided that only minor friction and adjusting forces are encountered. These mechanical feeding systems are designed in conformity with the principle of pawl control and operate in connection with gear drives, worm drives, and cam drives. Also, the employment of fine-pitch feed spindles or ball roll spindles is unable, when greater forces are encountered, to assure a uniform feeding at the required precision for any length of time since such spindles cannot be produced with sufficient accuracy and have not the required rigidity.

Hydraulic transmissions with a throttling of the pressure fluid are unsuitable for very fine adjusting strokes because the viscosity depends to a considerable degree on the temperature whereby the adjusting precision will be greatly influenced.

Also feeding movements which are produced as the difference between two oppositely moved systems are not suited for very minute adjusting strokes within the range of a few ten-thousandths of a millimeter, because such feeding movements, in view of the numerous individual elements involved in such systems, contain too many errors.

The high requirements concerning a maximum adjusting precision can be realized effectively only when the rigidity between the machine carriage and the adjusting system is very great and when, above all, intermediate elements are avoided which, due to the processes of manufacturing same, have inherent thereto errors concerning their length or shape. Thus, in order to meet the requirements, it is necessary that the machine carriage and the adjusting system are directly rigidly connected to each other. Prior to the present invention, two feasible systems have become known which are able to meet the above-outlined requirements. These two systems operate either according to the principle of magnetostriction or according to the principle of high frequency induction heating. A great disadvantage fo these systems is seen, however, in the considerable number of transformers and electronic control elements.

According to the magnetostrictive adjusting system, the current heat has a disadvantageous effect inasmuch as the current can remain turned on for a very short period of time only. For carrying out a single feeding step, six operations are necessary of which four are clamping and unclamping operations. Although the clamping means for holding and releasing the bar as hydraulic clamping member are structurally simple, the adjusting process is rather complicated and requires a complicated control in order to be able by a plurality of lengthening and shortening operations to bring about a certain feeding range.

It is, therefore, an object of the present invention to provide a method of and device for producing very fine adjustments for tool carriers and the like, which will overcome the above-mentioned drawbacks.

It is another object of this invention to provide a method of and device for producing very fine adjustments for tool carriers and the like which will be able to realize such fine adjustments without requiring complicated and expensive elements and/or systems.

It is still another object of this invention to provide a method and device as set forth in the preceding paragraphs in which the friction of the elements employed has been reduced to a minimum.

These and other objects and advantages of the invention will appear more clearly from the following specification in connection with the accompanying drawings, in which.

Figure 4:
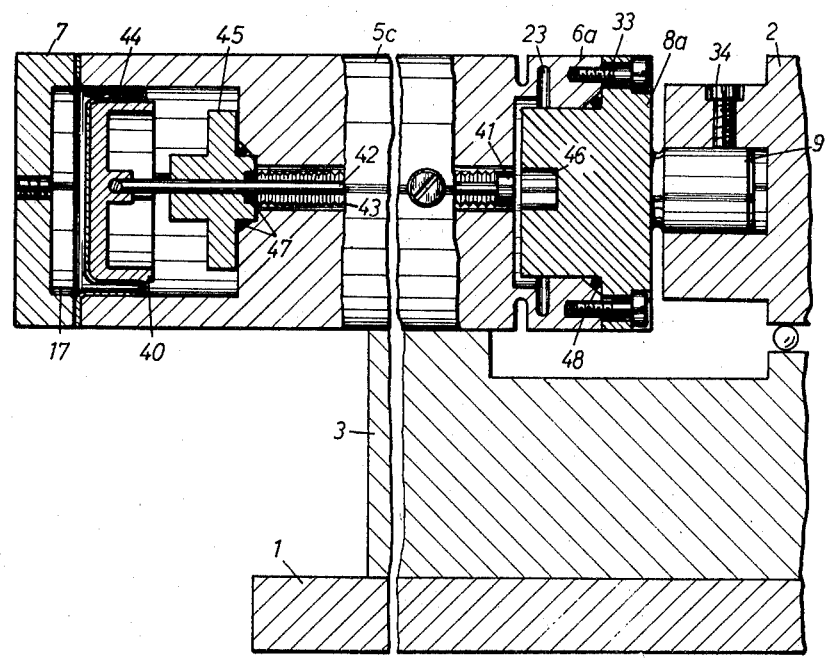

FIGURE 4 diagrammatically illustrates in section the fundamental structure of a device according to the invention comprising a roller diaphragm, a diaphragm carrier, a piston rod, and a pressure operable piston;

FIGURE 5 is a section through an improved device with pressure adjustment in which an equalizing pressure is produced in the interior of a spring pipe;

FIGURE 6 is still another modification of a device according to the invention in which the spring pipes of FIGURE 5 have been replaced by simple sealing elements.

FIGURE 6a, shows the left hand end portion of the structure illustrated in FIGURE 6.

In comformity with the method of the present invention for producing very minute adjusting strokes for tool carriers or the like, compressed air within the customary pressure range, for instance, within the range of from 0 to 4 atmospheres above atmospheric pressure is conveyed into a compressed air chamber. From here the force is conveyed through a plurality of transmitting elements to an expansion bushing the expansion of which below the part rigidly connected to the guiding means and the part actuated by the serially last transmitting element is conveyed to a coupling member which is rigidly connected to the tool carriage. Furthermore, following the completed adjusting operation, compressed air may be conveyed to a return chamber which brings about a power flow and a movement of the transmitting members in reverse direction and thus accelerates the return movement.

The device according to the invention for carrying out the method of the present invention is characterized primarily in that a housing for the transmitting members, which is rigid in its longitudinal direction, is connected to the guiding means and has one end rigidly connected to an expansion bushing. The other end of said expansion bushing is by means of a coupling connection rigidly connected to the tool carriage. According to the present invention, two stepped pistons in the housing serve as transmitting members which members are interconnected through an intermediate pressure chamber containing a non-compressible medium. Furthermore, between the last-mentioned piston of the second stepped piston on one hand and that end of the expansion bushing which is connected to the tool carriage through the intervention of a cover and a coupling connection on the other hand, there is provided a chamber containing a non-compressible medium. This last-mentioned piston is surrounded by an annular bushing which, with a modified design, is provided with a parabolic merging contour. In conformity with the invention, in said chamber there may be provided an equalizing ring of a pressure medium the hysteresis of which at a no-load condition is equal but offset to the hysteresis of the pressure transmitting medium.

According to a further feature of the present invention, the intermediate pressure chamber is sealed by means of two elastic non-expansible diaphragms. The expansion bushing is easily detachably connected to the housing and provided with smooth walls or bored recesses. The stepped pistons are guided in anti-friction bearings or pneumastatic bearings. The method according to the invention eliminates the above-outlined drawbacks of heretofore known systems of the type involved, and the feeding movements are effected through an expansible bushing which obtains the required power through a plurality of transmission stages. The expansion bushing is so designed that it will be expanded only within Hook's range, so that no permanent deformation can occur. The first chamber of the transmitting members is acted upon by compressed air at normal pressures of operation varying from 0.5 to 6 atmospheres above atmospheric pressure, while the intermediate pressure chamber is filled with a non-compressible liquid. This chamber is confined by a suitable diaphragm which permits an axial displacement of the pistons within required limits and has a resistance of its own which is negligible with regard to an adjustment, said resistance remaining the same over the entire stroke.

In the last-mentioned chamber of the transmitting elements there prevails a very high pressure due to the high transmission ratio, so that a pressure transmitting medium is required which will be able to withstand the respective maximum pressures. More specifically, for this purpose a medium is provided the transverse contraction number of which equals 0.5 and the compressibility factor of which equals zero. This pressure conveying medium, which will be able to withstand maximum pressures, may consist, for instance, of rubber, synthetic material of mercury. With these materials, the inner friction is extremely low so that an occurring hysteresis will be small with regard to the adjusting precision.

By means of the device according to the present invention, there will be engaged an oscillating damping element which is rigid in its longitudinal direction and is located between the tool carriage and the guiding means therefor. This element has sufficient rigidity to meet the above-mentioned high requirements and has a rigid holding device which is rigidly connected to the guiding means for the carriage. The device, which is variable as to its length by the expansion of the expansion bushing, transmits all required adjusting forces without the provision of intermediate elements directly upon the tool carriage.

For purposes of reducing the friction losses, the pistons of the transmitting members are guided in anti-friction bearings or in pneumostat bearings.

The advantage of the invention is to be seen in the fact that with preloaded air within the customary pressure ranges varying, for instance from 0 to 4 atü., high adjusting forces bring about the change in length of a device which is longitudinally rigid, without the necessity of employing devices composed of numerous and complicated parts and without requiring any material quantities of energy. With the heretofore fine adjustment of 2.5 millimicrometers per second, an output in the neighborhood of only 5 watts is required. Even for adjusting the maximum stroke of, for instance, 70 micrometers per second, only an output of approximately 100 watts is required for the compressed air bringing about the desired adjustment.

The device according to the present invention is also able to produce any desired adjusting characteristic since with heretofore known pneumatic governors it is easy to cause the transmitting means to adapt themselves to the adjusting system and the adjusting stroke. When, for instance, the measuring operation is carried out pneumatically, it is possible by simple means to build up a pneumatic control circuit while employing the device according to the present invention without the necessity of employing complicated and expensive energy converters. The control deviation is in this connection caused by various disturbing influences of the machining system and the surroundings. A pneumatic linear governor is able from the control deviation to build up a signal entered into the device according to the present invention for compensating the varying deviation of the tool carriage by the expansion of the expansion bushing.

In order to realize a power transmission with a minimum of friction, it is suggested as transmitting member to provide a diaphragm carrier which is sealed relative to the compressed air chamber by means of a roller diaphragm, and furthermore to provide a pressure fluid operable piston which is connected to the diaphragm carrier by means of a piston rod. This last-mentioned piston is adapted to increase the pressure of an approximately incompressible liquid in a pressure chamber, said pressure chamber being arranged within the range of recesses of the expansion bushing.

According to one embodiment of the invention, that portion of the piston rod which extends from the compressed air chamber is surrounded by a spring pipe which is connected on one hand to the pressure piston and on the other hand to a closure member in a pressure-tight way. The expansion bushing forms one piece with the housing while the pressure chamber is formed in the cover. In this way, an arrangement is obtained in which a friction-low power transmission will be assured by the employment of a rolling diaphragm and by the employment of the spring pipe as sealing element. In order to prevent the spring pipe from being subjected from the outside to a high pressure, according to a further embodiment of the invention, it is suggested that the spring pipe also on its inside be acted upon by a liquid, the pressure of which is variable by a pressure control device. To this end, the pressure adjusting device comprises a pressure control piston which by means of an adjusting screw is adjustable in a pressure control chamber in the housing while the pressure adjusting chamber communicates with the interior of the spring pipe. According to a further development of the invention, a second pressure piston with a second spring pipe corresponding to the first spring pipe is arranged on said piston rod. Advantageously, the inner pressure is selected about half as high as the last pressure in the non-compressible outer liquid so that at the same outer pressure the spring pipe, due to the differential pressure, will with the second embodiment be subjected to a load which is only half the load acting upon the spring pipe of the first embodiment.

In order further to improve the device according to the present invention, it is suggested to seal the piston rod at the passage of the closure by sealing elements instead of spring pipes, said sealing elements being formed for instance by round cord rings inserted in a ring.

Figure 1:
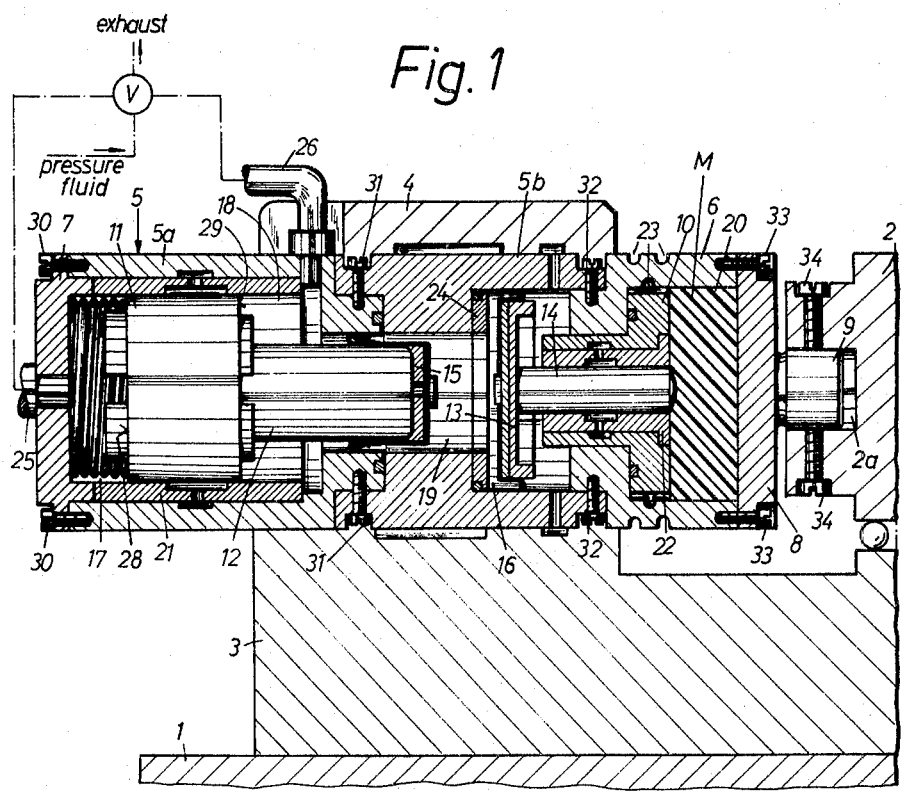
FIGURE 1 represents a longitudinal section through a device according to the present invention.

Referring now to the drawings in detail and FIG. 1 thereof in particular, the device shown therein is by means of a bearing cover 4 rigidly connected to guiding means 3 of a tool carriage 2, said guiding means 3 being arranged on a bed or foundation 1. Bearing cover 4 may by means of elements known per se be tightened and loosened in customary manner so that the entire device according to the invention can easily be exchanged. The device itself which comprises a housing 5 may be sub-divided into two sections 5a and 5b and by means of screws 32 is rigidly connected to an expansion bushing 6 (Dehnbüchse). The two housing sections are connected to each other by means of screws 31.

Housing section 5a is covered by an inlet cover 7 which in its turn is connected to said section 5a by means of screws 30. Housing section 5a comprises the first stepped piston 11, 12 and the pneumostatic bearing 21 of the compressed air piston 11.

The smaller diameter piston portion 12 of the stepped piston 11, 12 extends into housing section 5b and has its end face connected to a diaphragm 15 which in its turn has its outer marginal portion clamped between the two housing sections 5a and 5b. A second diaphragm 16 is by means of a holding ring 24 likewise arranged inside housing section 5b and has its central portion connected to a piston 13 which latter forms the larger diameter piston portion of a second stepped piston 13, 14. Piston portion 14 of this stepped piston 13, 14 is guided in a pneumostatic bearing 22 which is surrounded by a bushing 10 and located inside the expansion bushing 6.

The free end of expansion bushing 6 is closed by a cover 8 secured to bushing 6 by means of screws 33. Bushing 6 has connected thereto a coupling connection 9 adapted by means of screws 34 rigidly to be clamped fast in a corresponding recess 2a of tool carriage 2.

This device is adapted to be acted upon by compressed air within customary pressure ranges as from 0 to 4 atü., said compressed air being admitted through an inlet 25. The pressure thus obtained in a compressed air chamber 17 will in conformity with the piston surface 28 exert a force which will move stepped piston 11, 12 in the direction toward a pressure chamber 19 by a certain distance, said pressure chamber 19 being formed by the two stepped pistons 11, 12 and 13, 14. As a result of this advancing movement of stepped piston 11, 12, a pressure will build up in pressure chamber 19 which corresponds to the pressure transmission ratio in conformity with the effective surfaces of pistons 11 and 12. This pressure in pressure chamber 19 is conveyed to the surface of piston portion 13 of the stepped piston 13, 14 and moves piston portion 13 by a certain distance in the direction toward a chamber 20 which is formed between cover 8 at the end of the expansion bushing 6 and piston 14 as well as bushing 10. This advancing movement of piston 14 again results in a pressure increase in chamber 20 which pressure increase with regard to the surface of cover 8 results in a very considerable force which expands expansion bushing 6, which has a certain rigidity, by a certain amount.

The expansion of expansion bushing 6 is conveyed to coupling connection 9 which latter is fixedly connected to tool carriage 2 so that said tool carriage will move in the direction of its expansion by an amount corresponding to the expansion of expansion bushing 6 with regard to the guiding means 3. In this way, a tool carrier fixedly connected to the tool carriage 2 is moved in the direction toward the workpiece by a distance corresponding to said expansion and will thus bring about a chip removal within the range of the fine adjustment.

The bushing 6 which brings about the feeding movement may, by correspondingly deep cuts or recesses 23, be given a certain rigidity which will be sufficient for the adjustment of the carriage 2 at the desired high precision.

In order to accelerate the return movement of stepped piston 11, 12, compressed air of the customary pressure ranges as from 0 to 4 atü. may be introduced into a return chamber 18 through a conduit 26. In said return chamber 18 the compressed air acts upon an annular surface 29 of piston 11. In this way, a double acting device will be obtained.

Pressure chamber 19 of the device is filled with a non-compressible liquid as for instance oil. Pressure chamber 19 is hermetically sealed by diaphragms 15 and 16 which permit an axial movement of pistons 12 and 13 in both directions to the desired extent. In view of the high pressure, a pressure medium M is provided in chamber 20 which pressure medium will be able to withstand high pressures and the compressibility factor of which is substantially zero. This medium may for instance be a suitable rubber, synthetic material such as polyvinyl chloride or mercury.

Figure 2:
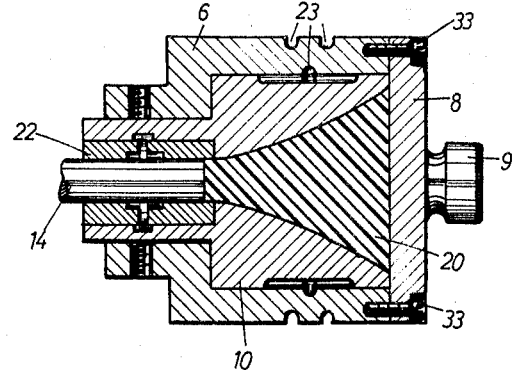
FIGURE 2 is a section through an expansion bushing with a transmitting element somewhat modified over that of FIGURE 1.
Figure 3:
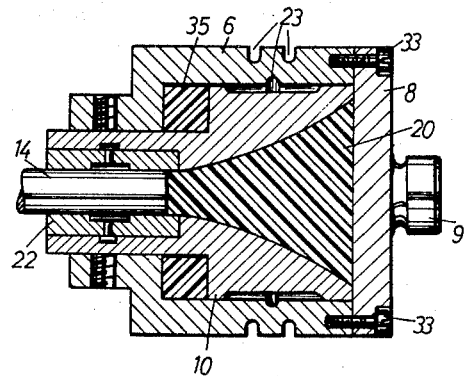
FIGURE 3 represents a section through an expansion bushing modified over that of FIGURE 2.

In order to obtain a better pressure distribution in chamber 20, according to the modification shown in FIG. 2, bushing 10 and thus also the pressure transmitting medium M1 in chamber 20 may have a parabolic merging contour as is clearly shown in FIG. 2. In order to be able within the total adjusting range of the device to compensate for stroke losses which may occur in view of the hysteresis of the pressure conveying medium when the system is relieved, it is suggested in conformity with the modification of FIG. 3 additionally between the expansion bushing 6 and the parabolic bushing 10 to provide a compensating ring 35 of a pressure medium which pressure medium in its turn has a hysteresis which when relieving said pressure medium equals but is opposite to the hysteresis of the pressure medium in chamber 20. Inasmuch as in this way, when relieving the device, the total of the hysteresis is zero, the stroke losses will be compensated for or balanced over the total adjusting range.

According to the embodiment of FIG. 4, the front side of housing 5c which houses the transmission members is closed by an inlet cover 7 in which the inlet to the compressed air chamber 17 is located. On the other side of the housing 5c there is arranged an expansion bushing 6a which through a cover 8a having a coupling connection 9 is connected to tool carriage 2. A screw 34 fastens the coupling connection 9 to the longitudinally movable tool carriage 2. As transmitting members in conformity with the invention, there are provided a diaphragm carrier 40 which by means of a rolling diaphragm 44 is sealed with regard to compressed air chamber 17, and a compressed air piston 41 which by means of a piston rod 42 is connected to said diaphragm carrier 40. By means of this arrangement, the low air pressure in compressed air chamber 17 is directly converted into a high adjusting pressure acting upon the expansion bushing 6a. The expansion bushing 6a houses a nearly non-compressible liquid adapted to be acted upon by pressure piston 41 in pressure chamber 46. Piston rod 42 extends through a closing stopper 45 from pressure chamber 17 while a seal 47 seals pressure chamber 46 with regard to housing 5c. Between the said stopper 45 and pressure piston 41, piston rod 42 is surrounded by a spring pipe 43 which latter on one hand is in a pressure-tight manner connected to piston 41 and on the other hand to stopper 45. Stopper 45, which is screwed to housing 5c, at the same time also serves as guiding means for piston rod 42. Compressed air chamber 17 is sealed relative to the interior of the housing by the rolling diaphragm 44 which rests on diaphragm carrier 40 and has its outer marginal area clamped in between housing section 5c and cover 7. This rolling diaphragm 44 is acted upon by a low air pressure up to 2.5 atmospheres above atmospheric pressure. The force resulting from the effective surface of the rolling diaphragm 44 and the air pressure acts through the described mechanism upon the almost non-compressible liquid in pressure chamber 46 and therein produces a pressure in conformity with the surface ratio between the effective diaphragm surface and the effective piston surface.

According to the embodiment of FIG. 4, pressure chamber 46 is arranged within the range of the grooves or recesses 23 of expansion bushing 6a. For practical reasons, this pressure chamber 46 is formed in cover 8a, and expansion bushing 6a is formed as a single integral piece with housing 5c. The seal of cover 8a, which by means of screws 33 is connected to housing section 5c, is effected by means of a sealing member 48.

The arrangement according to FIG. 4 has the advantage that it permits a friction-low power transmission which is effected on one hand by the employment of a rolling diaphragm 44 and on the other hand by the provision of a spring pipe 43 as sealing element.

There is, however, one drawback inherent to the embodiment of FIG. 4, viz, that the spring pipe 43 is exposed to high pressures. This drawback, however, has been overcome by the arrangement of FIG. 5. According to FIG. 5, also the interior of the spring pipe 43 is subjected to a pressure which is adjustable by corresponding pressure adjusting means. Preferably, the said inner pressure is selected so that it will amount to half the pressure of the maximum pressure in the non-compressible outer liquid so that at the same outer pressure the spring pipe 43 will be subjected to only half the load to which it is subjected with the embodiment of FIG. 4 because only the differential pressure is effective upon said spring pipe from the outside. Inasmuch as with the exception of the pressure adjustment, the structure of the device of FIG. 5 corresponds to that of FIG. 4, it is merely necessary to describe the mechanism for the pressure relief.

According to the arrangement of FIG. 5, piston rod 42 has arranged thereon a second pressure piston 49 which by means of a second spring pipe 50 is connected to a second closure member 51. This arrangement is surrounded by a second pressure chamber 52 which contains the approximately non-compressible liquid adapted to be introduced into said first spring pipe 43 through said first closure member 45a.

The pressure adjusting device comprises a pressure adjusting piston 53 which by means of an adjusting screw 54 is adjustable in a pressure adjusting chamber 61 provided in the right hand section of the housing shown in FIG. 5. This pressure adjusting chamber 61 communicates with the interior of spring pipe 43. By turning adjusting screw 54, the latter through the intervention of an adjusting spring 55 connected by a piston disc 56 with the pressure adjusting piston 53 brings about a displacement of pressure adjusting piston 53 and thereby a change in pressure of the liquid in the interior of spring pipe 43. Pressure adjusting piston 53 is by means of a closure member sealed with regard to the adjusting screw 54, said closure member 57 having a gasket 58 inserted therein.

The effective surfaces of spring pipes 43 and 50 are selected of the same dimensions so that by the relief pressure no additional forces will be exerted upon piston rod 42. Furthermore, with a stroke of piston rod 42, a change in volume in view of the change in length of the spring pipe 50 results in the same increase in volume by the change in length of spring pipe 43. In this way the inner pressure of spring pipe 43 remains constant. The pressure chamber 46 in which, in view of the high pressure there is brought about the force for the expansion of the expansion bushing 6a and thus for the adjustment of the tool, as well as the second pressure chamber 50 containing the pressure compensation liquid for spring pipe 43, are in conformity with FIG. 5 closed by means of closure screws 59 and 60 in the right hand section of the housing shown in FIG. 5. By means of this design according to FIG. 5, a friction-low power transmission and power transmission ratio will be obtained while, in addition thereto the employed spring pipe 43 is relieved from too high pressures.

FIG. 6 illustrates an embodiment which in principle corresponds to that of FIG. 5. However, with the arrangement of FIG. 6, piston rod 42 is at the passages through the closure members 45b and 51b sealed merely by means of sealing elements 62 and 63 instead of spring pipes. These sealing members 62 and 63 may be designed in the form of O-rings inserted in a ring 64, 65. These O-rings may consist of rubber or synthetic material such as polyurethane but may also be replaced by other sealing elements of rubber or such synthetic material which is adapted to function in the same manner as said O-rings. For purposes of journalling said O-rings, closure members 45b and 51b are unilaterally recessed for receiving a corresponding ring 64, 65 respectively. Rings 64 and 65 are recessed in such a way that the O-rings fit in the remaining intermediate space and will be pressed against piston rod 42 in a manner required for effecting a seal. Rings 64 and 65 are, following the insertion of the O-rings 62 and 63 firmly pressed into closure members 45b and 51b. For purposes of sealing the transmission members relative to the right hand section of the housing shown in FIG. 5, a fluid seal 64 is employed in connection with the closure member 45b, whereas an O-ring 66 is employed in connection with closure member 51b.

In view of the fact that also with the embodiment of FIG. 6 a relief fluid with pressure adjusting means is employed, the sealing element 62 in closure member 45b will only be under the load of a differential pressure of the two media. Thus, similar to the embodiment of FIG. 5, considerably higher pressure can be employed in pressure chamber 46 for obtaining the force which brings about an expansion of expansion bushing 6a.

It is, of course, to be understood, that the present invention is, by no means, limited to the particular arrangements shown in the drawings, but also comprises any modifications within the scope of the appended claims.

While the expansion bushing or expansion member referred to above may be made of various material, material such as steel, bronze or aluminum have proved particularly suitable for this purpose.

The spring pipes referred to in the preceding specification and in the following claims may be of the general character disclosed for instance in U.S. Patent 2,722,451, 2,433,493 or 2,193,295.

What we claim is:

1. An apparatus for producing a minute adjusting stroke of a tool support, which comprises: housing means including fluid pressure operable piston means reciprocable in said housing means, expandable bushing means rigidly connected to said housing means and expandable in the axial direction of said piston means, said bushing means being rigidly connectable to a tool support, and transmission means interposed between said piston means and said bushing means and operable in response to the movement of said piston means in the direction toward said bushing means to bring about an expansion of said bushing means in the direction of movement of said piston means toward said bushing means to thereby effect a minute adjustment of a tool support connected to said bushing means a distance corresponding to the respective expansion of said bushing means, said fluid pressure operable piston means comprising two stepped pistons axially spaced from each other so as to confine therebetween and with said housing means an intermediate chamber adapted to be filled with a noncompressible medium, and pneumostatic bearing means guidingly supporting said stepped pistons.

2. An apparatus for producing a minute adjusting stroke of a tool support, which comprises: housing means including fluid pressure operable piston means reciproable in said housing means, expandable bushing means rigidly connected to said housing means and expandable in the axial direction of said piston means, said bushing means being rigidly connectable to a tool support, and transmission means interposed between said piston means and said bushing means and operable in response to the movement of said piston means in the direction toward said bushing means to bring about an expansion of said bushing means in the direction of movement of said piston means toward said bushing means to thereby effect a minute adjustment of a tool support connected to said bushing means a distance corresponding to the respective expansion of said bushing means, that end of said housing means which is remote from said expandable bushing means confining a portion of a first chamber adapted to receive fluid under pressure, a first piston reciprocable in said first chamber, rolling diaphragm means having its marginal portion connected to said housing means and having its central portion connected to said first piston, cover means connected to that end of said expandable bushing means which is remote from said housing means and confining a second chamber, said second chamber being adapted to receive a non-compressible medium, passage means arranged within said housing means and extending from said first chamber to said second chamber, closure means sealing said passage means with regard to said first chamber, a second piston reciprocable in said second chamber and within said passage means, connecting rod means rigidly connecting said second piston to said first piston for actuation by the latter, the effective surface of said second piston being considerably less than the effective surface of said first piston, and a spring pipe surrounding a portion of said connecting rod means adjacent said second piston and confining with said second piston and said closure means a pressure sealed chamber.

3. An apparatus for producing a minute adjusting stroke of a tool support, which comprises: housing means, one end of said housing means confining a portion of a first chamber adapted to receive fluid under pressure, first piston means reciprocable in said first chamber, rolling diaphragm means having its marginal portion connected to said housing means and having its central portion connected to said first piston means, cover means rigidly connected to the other end of said housing means and forming an expandable member, said cover means confining a portion of a second chamber adapted to receive a non-compressible medium, passage means arranged within said housing means and extending from said first chamber to said second chamber, closure means sealing said passage means with regard to said first chamber, second piston means reciprocable in said second chamber and within said passage means, connecting rod means rigidly connecting said second piston means to said first piston means for actuation by the latter, spring pipe means confining with said second piston means and said closure means a pressure sealed chamber, and means for rigidly connecting said expandable member to a tool support.

4. An apparatus according to claim 3, which includes means for exerting fluid pressure upon the inside and the outside of said spring pipe means.

5. An apparatus according to claim 4, which includes a third chamber adapted to receive pressure fluid and communicating with the interior of said spring pipe means, third piston means reciprocating in said third chamber for varying the pressure therein and thereby in said spring pipe means, and adjustable means operable to act upon said third piston means for actuating the same.

6. An apparatus for producing a predetermined minute adjusting stroke of a tool support in response to the application of a predetermined adjusting force, which comprises: housing means, first fluid pressure operable piston means reciprocable in said housing means, axially expandable bushing means rigidly connected at one end to said housing means and expandable in the axial direction of said first piston means, said bushing means being adapted for rigid connection at its other end to a tool support, a substantially incompressible pressure transmission medium interposed in confined relation between said first piston means and said bushing means and operable in response to the movement of said piston means in the direction toward said bushing means to cause the said axial expansion of said bushing means, at least one second piston means associated with said first piston means, said first piston means having a comparatively small end face at its end facing said expandable bushing and a comparatively large end face at its end facing said second piston means, said second piston means having a comparatively small end face at its end facing said first piston means and a comparatively large end face at its end remote from said first piston means, means defining a first chamber in said housing in which the small end face of said second piston means and the large end face of said first piston means is disposed, a body of incompressible fluid sealed in said first chamber between said first and said second piston means, and a second chamber in said housing in which the large end face of said second piston means is disposed and having an inlet for the supply thereto of a fluid under pressure.

7. An apparatus according to claim 6, in which said piston means includes fluid pressure operable surface means operable when being subjected to fluid pressure to move said piston means in a direction away from said bushing means to speed up the return of said piston means to its starting position.

8. An apparatus according to claim 6, in which said expandable bushing means is integral with said housing means.

9. An apparatus according to claim 6, wherein said expandable bushing means has a cylindrical axial wall portion, said wall portion being provided with at least one outer circumferential groove and at least one corresponding inner circumferential groove displaced axially along said wall portion with regard to said outer groove, said grooves forming at least one bendable beam-like region in said wall portion.

10. An apparatus according to claim 6, wherein said bushing means is closed by a cover at its end remote from said piston means, said non-compressible pressure transmission medium being interposed between said small end of said first piston and said cover and confined within said bushing means, an annular compensating member arranged within said bushing means and associated with said pressure transmission medium in force transferring relation thereto, said compensating member having a hysteresis characteristic in deformation which is equivalent to that of the pressure transmission medium but under no load being opposite to the hysteresis characteristic of said pressure transfer medium when the latter is under load.

11. An apparatus for producing a minute adjusting stroke of a tool support, which comprises: housing means including fluid pressure operable piston means reciprocable in said housing means, expandable bushing means rigidly connected to said housing means and expandable in the axial direction of said piston means, said bushing means being rigidly connectible to a tool support, and transmission means interposed between said piston means and said bushing means and operable in response to the movement of said piston means in the direction toward said bushing means to bring about an expansion of said bushing means in the direction of movement of said piston means toward said bushing means to thereby effect a minute adjustment of a tool support connected to said bushing means a distance corresponding to the respective expansion of said bushing means, said piston means including a second and a third piston arranged in axially spaced relationship to each other, piston rod means rigidly interconnecting all of said pistons, said housing means including first and second and third chamber means reciprocably receiving therein said first and second and third pistons, sealing means sealing said second and third chamber means relative to said first chamber means, means for admitting pressure fluid to said second and third chamber means, means for selectively varying the fluid pressure in said second and third chamber means, and spring pipe means surrounding the said piston rod means located in said second and third chamber means and sealing the rod means to the respective chambers.

References Cited

UNITED STATES PATENTS 3,213,625    10/1965    Worthen _____ 60—54.5

FOREIGN PATENTS 614,187    12/1948    Great Britain.
856,725    12/1960    Great Britain.

MARTIN P. SCHWADRON, *Primary Examiner.*

ROBERT R. BUNEVICH, *Examiner.*